(12) United States Patent
Strohmavr et al.

(10) Patent No.: US 7,017,981 B2
(45) Date of Patent: Mar. 28, 2006

(54) ROOF MODULE FOR A MOTOR VEHICLE AND PROCESS FOR PRODUCING SAME

(75) Inventors: Peter Strohmavr, Gernlinden (DE); Matthias Dichtl, Eurasburg (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 10/392,384

(22) Filed: Mar. 20, 2003

(65) Prior Publication Data

US 2003/0218363 A1    Nov. 27, 2003

(30) Foreign Application Priority Data

Mar. 20, 2002    (DE) ................. 102 12 370

(51) Int. Cl.
*B60J 7/00* (2006.01)
(52) U.S. Cl. .................. 296/210; 428/116; 428/141
(58) Field of Classification Search ............. 296/210, 296/191; 428/116, 141
See application file for complete search history.

(56) References Cited

U.S. PATENT DOCUMENTS

| | | | | |
|---|---|---|---|---|
| 4,119,749 A | * | 10/1978 | Roth et al. ................. | 296/210 |
| 4,150,186 A | * | 4/1979 | Kazama ..................... | 296/210 |
| 4,475,765 A | | 10/1984 | Vogt et al. | |
| 4,598,008 A | | 7/1986 | Vogt et al. | |
| 4,933,225 A | * | 6/1990 | Abe .......................... | 296/210 |
| 6,644,727 B1 | * | 11/2003 | Audibert et al. ........... | 296/210 |
| 2002/0021027 A1 | | 2/2002 | Kralik et al. | |
| 2003/0134085 A1 | * | 7/2003 | Haas et al. ................. | 428/116 |
| 2003/0155792 A1 | * | 8/2003 | Bohm et al. ................ | 296/210 |
| 2004/0104600 A1 | * | 6/2004 | Kiesewetter et al. ........ | 296/191 |

FOREIGN PATENT DOCUMENTS

| | | |
|---|---|---|
| DE | 32 02 594 C2 | 10/1984 |
| DE | 197 31 903 A1 | 1/1999 |
| EP | 0 960 803 A1 | 12/1999 |
| EP | 0 995 667 A1 | 4/2000 |

* cited by examiner

*Primary Examiner*—Lori L. Coletta
(74) *Attorney, Agent, or Firm*—David S. Safran

(57) ABSTRACT

A roof module for a motor vehicle with an outside roof skin and layers of composite materials located on the vehicle interior side of at least planar portions of the roof skin and a process for producing such a module. The layers on the vehicle-interior side are arranged in the order, beginning from the outside roof skin, of a first fiber-containing layer produced using the long-fiber injection process, and a carrier layer of stiffening material.

10 Claims, 4 Drawing Sheets

ROOF MODULE FOR A MOTOR VEHICLE AND PROCESS FOR PRODUCING SAME

BACKGROUND OF THE INVENTION

1. Field of the Invention

The invention relates to a roof module for a motor vehicle with an outside roof skin and layers of composite materials located on the vehicle interior side and a process for producing a multilayer roof module for a motor vehicle with an outside roof skin and layers of composite materials located on the vehicle interior-side.

2. Description of Related Art

Roof modules as are known, for example, from published European Patent Application EP 0 960 803 A2, constitute motor vehicle roofs which have been produced separately from the motor vehicle body and which are made sandwich-like with a roof skin and an underlying plastic layer made, for example, of foam plastic.

Published European Patent Application EP 0 995 667 A1 discloses a roof module as a composite component for motor vehicles, the roof module being composed of the outside roof skin and a reinforced plastic layer connected to it on the vehicle interior side for purposes of increasing the buckling stiffness and the overall strength. The plastic layer is made of a PUR foam which is formed from polyol and an isocyanate portion in a mixing ratio from 1 to 2. The mixing of the two plastic components with glass fiber reinforcement takes place using the long fiber injection (LFI) process in which PUR-wetted glass fibers are blown by compressed air into a negative mold already laid out with the outside skin. Roof modules which have been built up in this way do not have high stiffness and do have a total weight prevailing as a result of the of the high proportion of polyurethane (PUR).

German Patent DE 32 02 594 C2 and counterpart U.S. Pat. No. 4,475,765 disclose a roof module with an airtight and watertight outside roof layer, a middle, inherently stiff honeycomb/structure layer, with aluminum or cardboard ridges or semihard foam and nonwoven structures, a semi-stiff, porous inside layer and a cushion and/or decorative layer. One such multilayer roof module is produced using a hot pressing process. These roof modules based on a honeycomb or sandwich structure have the advantage that, as a result of the honeycomb layer which acts as the stiffening layer and carrier layer for other layers, they have higher stiffness with a lower overall weight. Production of multilayer roof modules of this type based on a honeycomb structure is time-consuming and complicated since generally glass fiber mats which extend on either side of the honeycomb layer are difficult to handle. Furthermore, these glass fiber mats are expensive as compared to glass fibers as are used in the LFI production process. In addition, positioning of the honeycomb layer within a negative mold which is used for carrying out the following pressing processes is generally complex and time-consuming.

SUMMARY OF THE INVENTION

Accordingly, a primary object of this invention is to provide a roof module which has high stiffness and low total weight.

A further object of the invention is to create a process for producing such a roof module that is less time-consuming and more economical.

One important aspect of the invention is that the roof module for a motor vehicle with an outside roof skin and layers of composite material located on the vehicle interior side, beginning from the outside skin, has the following layer structure at least on the planar portion: a first fiber-containing layer produced using the long-fiber injection process and a carrier layer of stiffening material which is preferably honeycombed. By combining a layer based on the LFI production process with a honeycomb, sandwich-like carrier layer, the advantages of the two techniques underlying these layers are combined with one another. On the one hand, the difficult and time-consuming handling of glass fiber mats as was necessary in the past in honeycomb carrier layers as a layer between the PU layer and the carrier layer, and on the other, the trade-offs which had to be made for the total weight and the stiffness according to the LFI process are eliminated.

The carrier layer, which is preferably honeycombed, can be made of a cardboard material, a plastic material of natural substances, a metal-containing material and/or a nonferrous material.

The layer containing the fibers can be a glass fiber, a natural fiber and/or a plastic fiber.

Based on the combination of layers which have been produced according to LFI technique with the honeycombed carrier layer (structure, PHC), there is an advantageous saving of the necessary material since fiber mats, such as glass fiber or plastic fiber mats, become superfluous and the proportion of PUR required for wetting the glass fibers according to the LFI technique is reduced as a result of the additionally stiffening carrier layer.

The honeycombs of the honeycombed carrier layer can be impregnated with an impregnation agent as protection against absorbing moisture according to one preferred embodiment.

If the honeycombed carrier layer is a cardboard material, it is treated to be resistant to bacteria according to a preferred embodiment in order to avoid accumulation of bacteria in the individual cells in areas with high atmospheric humidity.

The cells which are open at top and bottom preferably have a layer thickness of 10 mm which, during the pressing process, in certain roof areas, can be reduced to a layer thickness of up to 3 mm in order to enable, for example, in the head area, the maximum possible headspace for the vehicle passengers or mounting of additional attachments, such as handles, for example.

Since the roughly 25 mm long individual glass fibers, as are blown into a negative mold mixed with PUR by means of compressed air according to the LFI technique for producing the fiber-containing layer, are more economical than the glass fiber mats used in PU-PHC-PU technology, the cost reduction in the production of roof modules is considerable.

According to preferred embodiment, a second fiber-containing layer which is produced by means of the long fiber injection process follows the carrier layer on the vehicle interior side, in order to additionally increase the stiffness of the roof module in this way.

Since the lengthwise axes of the cells of the carrier layer, which run preferably parallel to one another, are aligned perpendicular to the individual planes of the layers, when the PUR-wetted fibers, such as glass fibers, are blown according to the LFI process, partial penetration of the individual glass fibers into the honeycombed structure, which is open at the top and bottom, occurs. This results in that a reduction of the sandwich stiffness as a result of the irregular distribution of the PUR-wetted glass fibers so that more PUR is needed, since the open cells are filled at least partially with PUR.

Therefore, according to one embodiment of the invention, between the first, upper fiber-containing layer and the carrier layer there is a first nonwoven layer which covers the carrier layer, and between a second lower fiber-containing layer and the carrier layer there is a second nonwoven layer which covers the carrier layer. Such a nonwoven layer can be formed of a glass fiber nonwoven material which, during performance of the LFI process, prevents penetration of PUR into the cells which are open at the top and bottom.

Advantageously, the blocking nonwoven material, moreover, causes a homogeneous material distribution of glass fibers and PUR within a fiber-containing layer which is produced using the LFI process, by which only a few surface faults can occur in these layers. Preferably, the blocking nonwoven material is made such that it protects the glass fibers of the first and second fiber-confining layer against penetration into the cell structure, but allows the PUR to penetrate into the honeycomb structure with a predefined penetration depth in order to thus increase or ensure adhesion between the first and second fiber-containing layer and the honeycombed carrier layer.

The blocking nonwoven material can be joined as a first and second covering nonwoven layer in the production of the roof module to a honeycomb layer in order to enable rapid insertion of the honeycombed carrier layer, including the nonwoven layer, into a negative mold and to avoid possible handling of glass fiber nonwoven-like material within the negative mold.

The first and the second fiber-containing layers with polyurethane can be adapted by variation of the two parameter fibers and polyurethane depending on the requirements for the total weight, the appearance, the strength and the functionality of the roof module and depending on possibly necessary integration of additional components into the roof module.

On the vehicle interior side, the layer structure in accordance with the invention can be closed with a laminated layer in order to create a pleasant appearance of the roof module for the vehicle passengers. The laminated layer can advantageously be applied with a vapor barrier layer, the vapor barrier layer being integrated into the laminated layer or arranged as a separate layer. In this way, the unwanted absorption of moisture and/or water by the polyurethane composite layers can be prevented.

Alternatively, the vapor barrier layer can be applied without a laminated layer on the vehicle interior-side, for example, in the form of an enamel layer or an enamel film for impregnation of the roof module.

The process for producing such a multilayer roof module with an outside roof skin and layers of composite materials located on the vehicle interior side comprises the steps of insertion of the outside roof skin into a negative mold, formation of the first fiber-containing layer by blowing polyurethane-wetted fibers by means of compressed air onto the vehicle interior-side surface of the outside roof skin, the formation of a carrier layer of stiffening material by its insertion into the negative mold with coverage of the first fiber-confining layer and pressing together the layers and the outside roof skin in a predetermined time interval with a predetermined temperature behavior.

In this way, a rapid and simple production process with a reduced cycle time is achieved since, for example, handling of glass fiber mats becomes superfluous.

Preferably, a second fiber-containing layer is located on the vehicle interior-side surface of the carrier layer for increasing the stiffness. This second and also the first fiber-containing layer can be located separated from the carrier layer by a nonwoven layer which covers the carrier layer, these nonwoven layers already being connected to the carrier layer before insertion of the carrier layer into the negative mold. Thus, after insertion of the outside skin into the negative mold, a first fiber-containing layer, based on the LFI process, must be blown into the negative layer by compressed air, the carrier layer including the nonwoven layer material must be inserted into the mold and a second fiber-confining layer, based on the LFI process, blown in by compressed air onto the carrier layer. After a following subsequent process, the roof module can be removed from the press molds in its final form.

The time which has been predetermined for the pressing process is dictated by the reaction time of the polyurethane and can be roughly 4 minutes. After completion of the pressing process, the pressed roof module is inserted into a separate cooling mold for preserving stability of shape.

Advantages and utilities of the invention can be taken from the following detailed description in conjunction with the accompanying drawings.

DETAILED DESCRIPTION OF THE INVENTION

Figure 1:
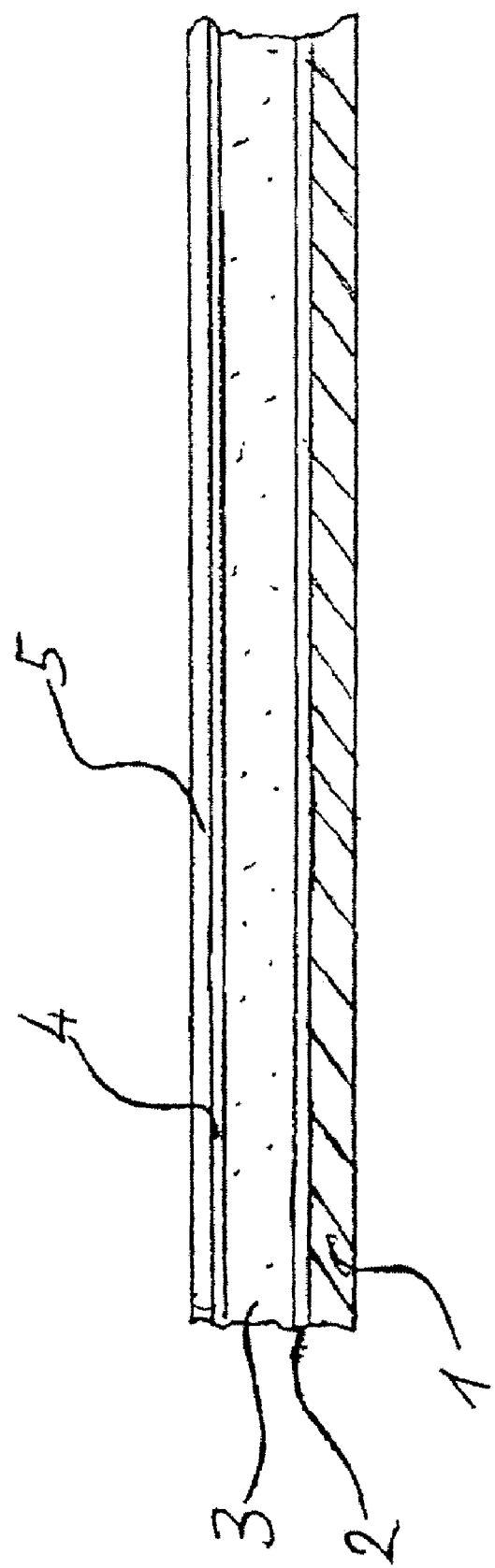
FIG. 1 is a schematic cross section of a first embodiment of the layered structure of a roof module in accordance with the invention.

FIG. 1 shows a first embodiment of the layered structure of a roof module which comprises an outside roof skin 1, a first glass-fiber containing layer 2 produced using the LFI process, a preferably honeycomb carrier layer 3 of stiffening material, such as PHC, a second glass fiber-containing layer 4 based on the LFI process, and a laminated layer 5 for a termination of the layered structure in the vehicle interior, which termination acts has a visually attractive appearance.

According to the production process, an outside roof skin is inserted into a negative mold of a pressing device, and by means of the LFI process, is covered with a layer 2 which contains PUR-wetted glass fibers and which are blown by means of compressed air into the negative mold. The glass fibers are preferably 10–100 mm long., The honeycomb carrier layer 3, is preferably made of the stiffening material PHC and is placed on the first layer 2 which contains the glass fibers. Then, a second glass-fiber containing layer (4) with PUR-wetted glass fibers, by means of the LFI process, is blown in by means of compressed air. Then, a pressing process takes place by closing of the pressing device for a predetermined reaction time at a certain temperature behavior. After opening of the pressing device, the roof module composite can be removed and subsequently covered with a laminated layer 5 as the vehicle interior-side termination layer.

Figure 2:
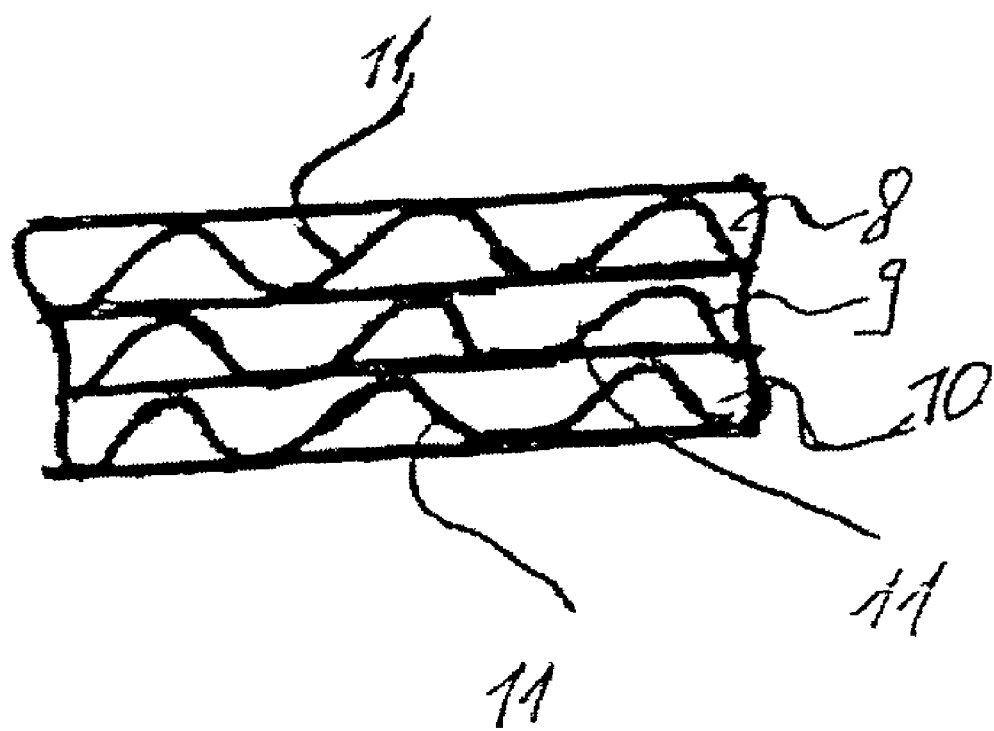
FIG. 2 is a schematic plan view of a carrier layer as is used in the layered structure of the roof module in accordance with the invention.

FIG. 2 schematically shows a plan view of the honeycomb structure used as the carrier layer 3. The cells are located in different layers 8, 9, 10 in a sandwich-like manner as spacers in the form of a carrier layer 3 between the two layers 3 and 4 containing the glass fibers. The honeycomb structure shown is similar to that of corrugated cardboard, and the cells 11 are open at the top and bottom so that, in particular, when applying the second glass fiber-containing layer 4, penetration of the PUR into the individual cells 11 takes place.

Figure 3:
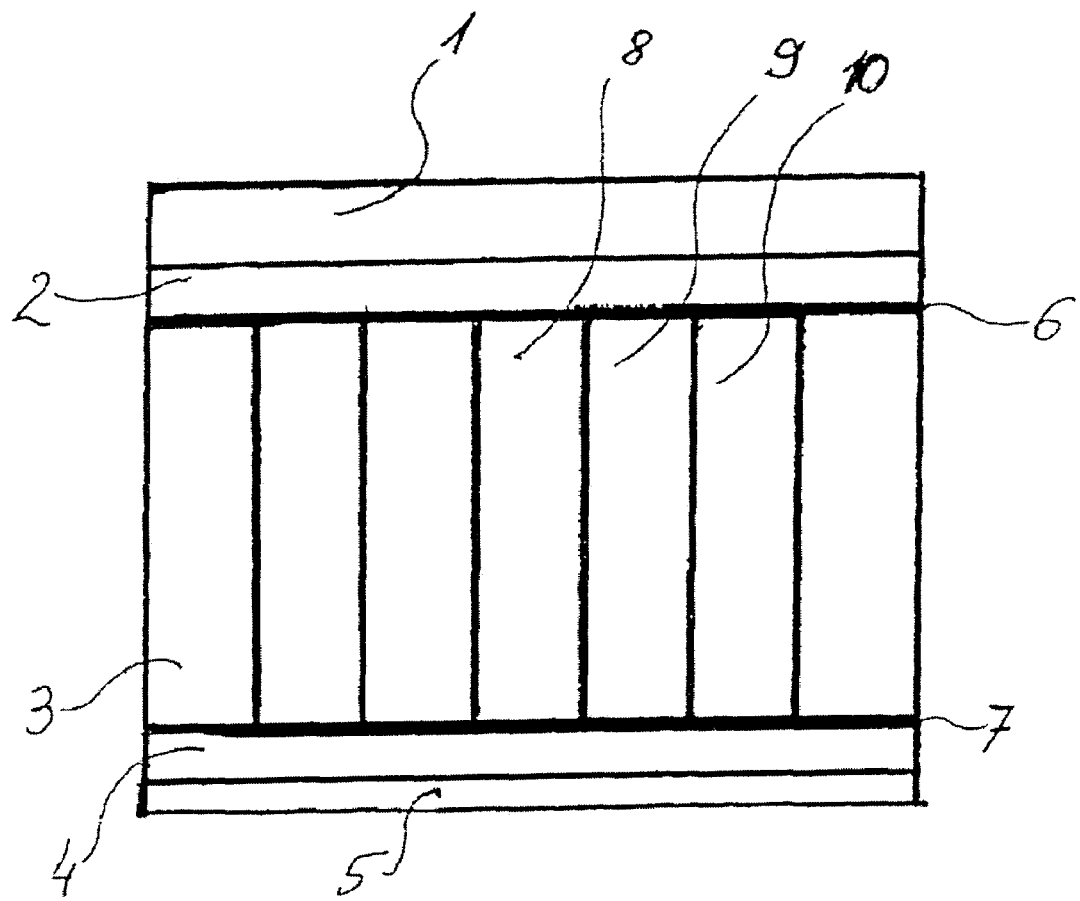
FIG. 3 is a schematic cross section of a second embodiment of the layered structure of a roof module in accordance with the invention.

In order to reduce the unnecessarily high consumption of PUR, as is shown in FIG. 3, according to a second embodiment of the layered structure of the roof module of the invention, the carrier layer 3 is covered with a blocking nonwoven material 6, 7, on the top and bottom sides, so that the PUR penetrates only to a predefined penetration depth into the honeycomb structure to ensure adhesion of the glass fiber-containing layers 2, 4 to the carrier layer. The glass fibers which are contained in the glass fiber-containing layers 2, 4 are kept by the blocking nonwoven material 6, 7 from penetrating into the honeycomb structure. In this way, the required amount of glass fiber and amount of PUR are reduced, and thus, weight and money are saved.

Figure 4:
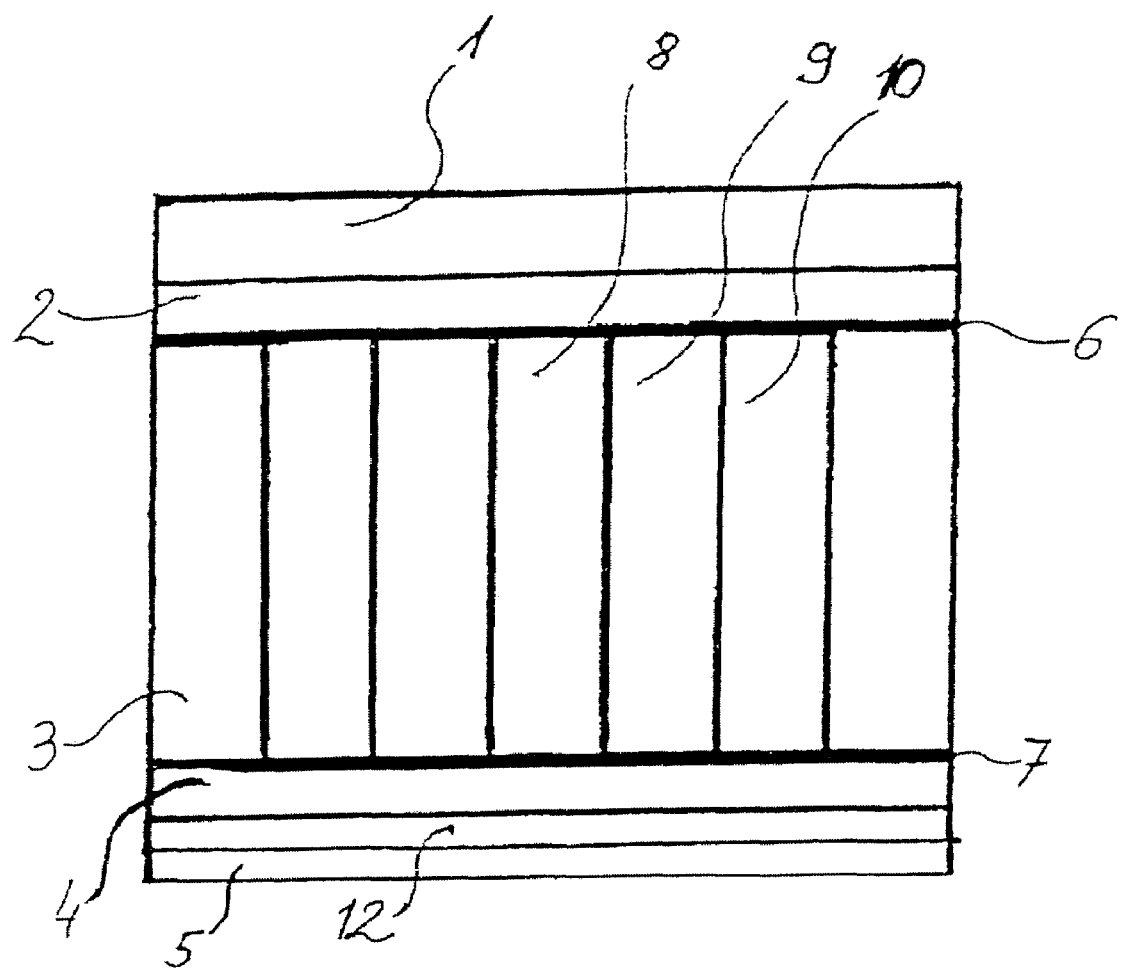
FIG. 4 is a schematic cross section of a third embodiment of the layered structure of a roof module in accordance with the invention.

FIG. 4 shows a schematic cross section of a third embodiment of the layered structure of the roof module as in accordance with the invention. The layered structure according to the third embodiment differs from the layered structure according to the second embodiment in that an additional vapor barrier layer 12 is provided between the glass fiber-containing layer 4 and the laminated layer 5. Such a vapor barrier layer 12 prevents accumulation of moisture and the associated impurities within the layered structure of the invention, especially within the honeycombed carrier layer.

The layered structure in accordance with the present invention can be used to form roof modules and body components of various configurations and which are attached to the vehicle body in any of various known manners. For example, a roof component of the type disclosed in U.S. Pat. No. 4,475,765 can been formed of the layered construction of the present invention instead of the composite construction disclosed therein. Thus, to the extend that the disclosure of this patent is necessary to complete an understanding of this invention, it is hereby incorporated by reference.

What is claimed is:

1. Vehicle body component for a motor vehicle with an outside roof skin and layers of composite materials located on an vehicle interior side of the roof skin, wherein the layers of composite materials have the following layer structure, at least on planar portions thereof, beginning from the outside roof skin:
   a first fiber-containing layer produced of a long-fiber injected material,
   and a carrier layer of a stiffening honeycomb material, and
   a blocking layer for preventing fibers of the first fiber-containing layer from penetrating into the carrier layer.

2. Vehicle body component as claimed in claim 1, further comprising, following the carrier layer in a direction away from the roof skin, a second fiber-containing layer produced of a long fiber injected material.

3. Vehicle body component as claimed in claim 2, wherein the stiffening honeycomb material of the carrier layer has a honeycomb construction with cells that have a lengthwise axes which run parallel to one another perpendicular to planes of said planar portions of the layers.

4. Vehicle body component as claimed in claim 1, wherein the blocking layer is a first nonwoven layer is provided which covers the carrier layer between the first fiber-containing layer and the carrier layer.

5. Vehicle body component as claimed in claim 4, wherein a second nonwoven layer is provided between the second fiber-containing layer and the carrier layer.

6. Vehicle body component as claimed in claim 5, wherein the first and second nonwoven layers are made of glass fiber nonwoven material.

7. Vehicle body component as claimed in claim 5, wherein the first and the second fiber-containing layers contain glass fibers and polyurethane.

8. Vehicle body component as claimed in claim 5. wherein the first and the second fiber-containing layers contain a soft foam material.

9. Vehicle body component as claimed in claim 1, wherein one of a laminated layer and a vapor barrier layer form an outer surface of the layered structure on a vehicle interior side.

10. Vehicle body component as claimed in claim 1, wherein said outside vehicle body skin is an outside roof skin and the vehicle body component is a roof module.

* * * * *